I. B. ARTHUR.

Corn Planter, Plow, and Cultivator.

No. 77,238.  Patented April 28, 1868.

Witnesses:

Inventor:
Isaiah B. Arthur
By
Attorneys

United States Patent Office.

ISAIAH B. ARTHUR, OF SIDONSBURG, PENNSYLVANIA.

Letters Patent No. 77,238, dated April 28, 1868.

IMPROVED COMBINED CORN-PLOUGH, PLANTER, AND CULTIVATOR.

*The Schedule referred to in these Letters Patent and making part of the same.*

TO ALL WHOM IT MAY CONCERN:

Be it known that I, ISAIAH B. ARTHUR, of Sidonsburg, in the county of York, and State of Pennsylvania, have invented a new and improved Combined Corn-Plough, Planter, and Cultivator; and I do hereby declare that the following is a full, clear, and exact description of the construction and operation of the same, reference being had to the annexed drawings, making a part of this specification, in which—

Figure 1:
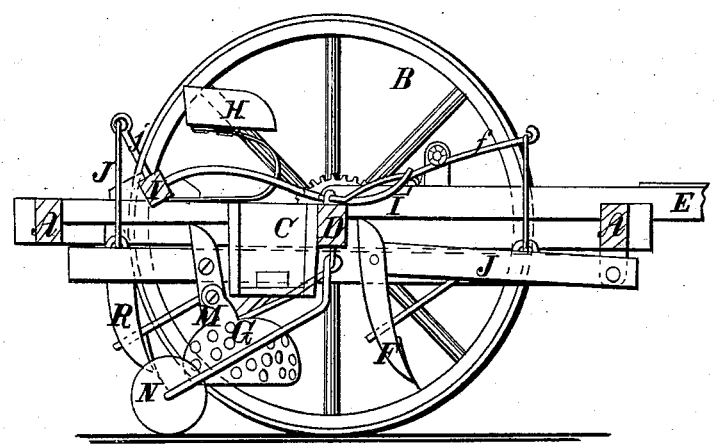
Figure 1 is a longitudinal vertical section.

This invention combines a new arrangement of the ploughs, cultivator-guards, and covering-roller with a new and greatly simplified method of operating the seed-distributer.

In the drawings, A A represent different parts of the frame; B B, the draught-wheels; D, the axle; C, the seed-box; E, the draught-pole; F, the front plough; M M, the two middle ones, and R R the two rear ones; G G', the guards employed in connection with the ploughs M M; H, the driver's seat; and I a roller by which all the ploughs except the front one can be simultaneously raised or lowered at pleasure by means of connections shown at $j\,j$.

The front plough, F, is attached to a beam, J, which is hinged at its front to the forward part of the frame A in such a manner that it can be raised and depressed by means of a treadle, $f$, near the driver's seat. The beam J, with its plough, F, is made detachable and removable. When the instrument is employed in ploughing or planting, all the ploughs are used, but when cultivating the corn, the front plough is taken off and only the middle and rear ones retained.

K K' are beams, pivoted like the beam J, which support the ploughs M M, R R, the two former ploughs being attached to bosses or arms jutting inward from the inner side, and the two latter being attached to similar projections jutting outward from the outer side of the plough-beams, by which means the ploughs are thrown out of line and made to cut parallel furrows at the proper distance apart.

The guards G G, which are employed, when cultivating, to shield the corn from the falling clods, and to allow only the fine dirt, mould, &c., to pass through and reach the corn, are made of curved plates of metal attached in any suitable manner to the standards or shanks of the ploughs M M, so as to rise and fall with them, always maintaining their relative position.

When ploughing very hard soil with a light team, previous to planting, the four rear ploughs may be raised by throwing forward the lever I', which controls the roller I, so as to leave but one plough, F, in the ground; and when planting, the same thing may be done, if desired.

The object of the instrument is, however, to enable the farmer to plough his field and plant his corn at the same time by going over the ground once. To do this, he must use the front plough, seeding-attachment, covering-roller, N, and one or both pairs of rear ploughs, M M, R R.

Figure 2:
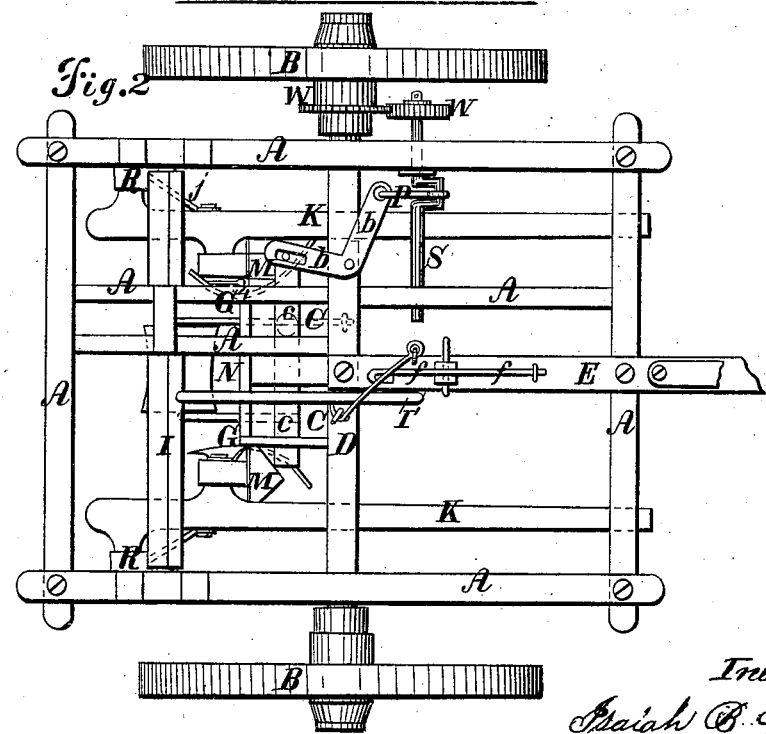
Figure 2 is a plan.

The rear ploughs, running outside of the furrow made by the plough F, in which the seed is planted, plough the ground beyond the furrow every time the machine crosses the field, keeping one or two furrows in advance of the furrowing-plough F, which comes after and makes a suitable channel to receive the seed. The seed is dropped directly in rear of the plough F, and the roller N, formed as shown in fig. 2, follows behind, catching the dirt from the sides of the furrow, and, by the operation of its concave shape, bringing such dirt to the centre of the furrow, so as to effectually cover the seed.

In cultivating the corn, as before remarked, the plough F and roller N are to be removed, and, if thought necessary, the two rear ploughs R R may also be taken off.

The seed-distributing arrangement is exceedingly simple and cheap, and can be attached to any form of planter. It consists of a reciprocating slide, $c$, working in the bottom of the seed-box, so as to open and close an aperture at the proper times, and connected by a right-angled lever, L, and a pitman, P, to a double crank-shaft, S, which is put in motion by one of the draught-wheels through the medium of proper gearing, $w\,w$. This is, perhaps, the simplest and most durable device that can be employed for the purpose.

It is evident, from the above description, that by means of this simple instrument, all the ploughing necessary to be done in the spring can be done simultaneously with the planting, instead of first going over the ground with a plough and afterwards with a seeder, as the custom has been heretofore. The saving of labor and time that will be effected by this means, is evident from the mere statement of the operation of the instrument.

Having thus described my invention, what I claim as new, and desire to secure by Letters Patent, is—

The combination and arrangement of the plough F, ploughs M M, R R, beams J, K K, roller I, lever I', guards G G, seed-box C, slide c, lever L, shaft S, and wheel B, when the said parts are constructed, combined, and arranged so as to operate substantially as and for the purpose specified.

ISAIAH B. ARTHUR.

Witnesses:
   PETER GARDNER,
   HOWARD P. HUTTON.